United States Patent
Ionascu (10) Patent No.: US 10,730,435 B2
(45) Date of Patent: Aug. 4, 2020

(54) METHOD FOR DETERMINING THE PRESENCE OF A TRAILER

(71) Applicant: JAGUAR LAND ROVER LIMITED, Coventry, Warwickshire (GB)

(72) Inventor: Mihai Ionascu, Warwickshire (GB)

(73) Assignee: JAGUAR LAND ROVER LIMITED, Coventry, Warwickshi (GB)

( * ) Notice: Subject to any disclaimer, the term of this patent is extended or adjusted under 35 U.S.C. 154(b) by 0 days.

(21) Appl. No.: 16/337,260

(22) PCT Filed: Sep. 11, 2017

(86) PCT No.: PCT/EP2017/072712
§ 371 (c)(1),
(2) Date: Mar. 27, 2019

(87) PCT Pub. No.: WO2018/059917
PCT Pub. Date: Apr. 5, 2018

(65) Prior Publication Data
US 2019/0225154 A1    Jul. 25, 2019

(30) Foreign Application Priority Data
Sep. 28, 2016    (GB) .................................. 1616426.1

(51) Int. Cl.
*B60T 7/20*        (2006.01)
*B60R 1/00*        (2006.01)
(Continued)

(52) U.S. Cl.
CPC ................ *B60R 1/003* (2013.01); *B60D 1/06* (2013.01); *B60D 1/245* (2013.01); *B60D 1/30* (2013.01);
(Continued)

(58) Field of Classification Search
CPC ............ B60R 1/003; B60R 2001/1223; B60R 2001/1253; B60R 2001/1284; B60D 1/06;
(Continued)

(56) References Cited

U.S. PATENT DOCUMENTS

| | | | |
|---|---|---|---|
| 7,786,849 B2 * | 8/2010 | Buckley | G08G 1/166 340/431 |
| 2009/0093928 A1 * | 4/2009 | Getman | G01S 15/87 701/37 |

(Continued)

FOREIGN PATENT DOCUMENTS

| | | |
|---|---|---|
| DE | 102004035039 A1 | 7/2005 |
| DE | 102004057220 A1 | 6/2006 |

(Continued)

OTHER PUBLICATIONS

Search and Examination Report, GB1616426.1, dated Mar. 8, 2017, 5 pp.

(Continued)

*Primary Examiner* — Munear T Akki
(74) *Attorney, Agent, or Firm* — Miller Nash Graham & Dunn LLP (57) ABSTRACT

A method for determining the presence of a trailer (12) attached to a vehicle (10), the method comprising: controlling a vehicle system to obtain a primary indication of the presence of a trailer (12); controlling one or more further vehicle systems to obtain one or more secondary indications of the presence of a trailer (12); and determining a confidence level for the presence of a trailer (12) attached to the vehicle (10) in dependence on the primary indication and the or each secondary indication.

15 Claims, 2 Drawing Sheets

(51) Int. Cl.

| | |
|---|---|
| *B60W 30/06* | (2006.01) |
| *B60D 1/30* | (2006.01) |
| *B60D 1/06* | (2006.01) |
| *B60D 1/62* | (2006.01) |
| *G06K 9/00* | (2006.01) |
| *G06K 9/62* | (2006.01) |
| *B60D 1/24* | (2006.01) |
| *B62D 13/06* | (2006.01) |
| *B60R 1/12* | (2006.01) |

(52) U.S. Cl.
CPC ............... *B60D 1/62* (2013.01); *B60W 30/06* (2013.01); *B62D 13/06* (2013.01); *G06K 9/00791* (2013.01); *G06K 9/00805* (2013.01); *G06K 9/6293* (2013.01); *B60R 2001/1223* (2013.01); *B60R 2001/1253* (2013.01); *B60R 2001/1284* (2013.01); *B60Y 2300/28* (2013.01)

(58) Field of Classification Search
CPC ............ B60D 1/245; B60D 1/30; B60D 1/62; B60W 30/06; B62D 13/06; G06K 9/00791; G06K 9/00805; G06K 9/6293; B60Y 2300/28
See application file for complete search history.

(56) References Cited

U.S. PATENT DOCUMENTS

| | | | |
|---|---|---|---|
| 2010/0007200 A1* | 1/2010 | Pelosse | B60T 7/20 303/7 |
| 2011/0253463 A1* | 10/2011 | Smith | B60D 1/00 180/11 |
| 2011/0257860 A1* | 10/2011 | Getman | G01S 15/87 701/70 |
| 2014/0160276 A1* | 6/2014 | Pliefke | B60R 1/00 348/118 |
| 2016/0052548 A1* | 2/2016 | Singh | B62D 15/0265 701/37 |
| 2017/0363728 A1* | 12/2017 | Prasad | G01S 7/411 |
| 2018/0068447 A1* | 3/2018 | Prasad | B60D 1/06 |
| 2018/0361929 A1* | 12/2018 | Zhang | H04N 7/181 |

FOREIGN PATENT DOCUMENTS

| | | |
|---|---|---|
| DE | 102009038552 A1 | 2/2011 |
| DE | 102012019234 A1 | 4/2014 |

OTHER PUBLICATIONS

International Search Report and Written Opinion, PCT/EP2017/072712, 12 pp.

\* cited by examiner

METHOD FOR DETERMINING THE PRESENCE OF A TRAILER

CROSS-REFERENCE TO RELATED APPLICATIONS

This application is a 371 of International Application No. PCT/EP2017/072712, filed Sep. 11, 2017, which claims priority to GB Patent Application 1616426.1 filed Sep. 28, 2016, the contents of both of which are incorporated by reference herein in their entirety.

TECHNICAL FIELD

The present disclosure relates to a method for determining the presence of a trailer attached to a vehicle. Aspects of the invention relate to a method, to a control system, to a vehicle, to a computer program product, and to a non-transitory computer-readable medium.

BACKGROUND

It is often useful for a vehicle to have knowledge of whether it is towing a trailer, for example to enable the vehicle to compensate for the presence of the trailer during automated manoeuvres such as obstacle detection and avoidance, or assisted parking. Typically a driver of the vehicle has to indicate the presence of a trailer manually.

Automated methods may also be used.

For example, the presence of a trailer can be detected using a body control module (BCM) of the vehicle to apply a voltage to an electrical connection point to which a trailer may be attached and then measure the level of electrical power drawn from the connection. If the power drawn from the connection point exceeds a predetermined threshold, this is taken as indicative of the presence of a trailer. However, this method is not entirely reliable for various reasons.

For example other types of rear-mounted equipment may be connected to the electrical connection point, such as a bike rack or a tailgate carrier such that the BCM may incorrectly determine that a trailer is present. Furthermore the BCM approach may not detect the presence of a trailer supplied with low-power LED lights, which may not draw sufficient electrical power to exceed the pre-determined threshold. It is also possible that a trailer may not be detected using the BCM approach if it is attached to the vehicle but is not properly connected to the electrical connection point, either through user error or due to an electrical fault.

While it may be possible to allow a driver of the vehicle to indicate that a trailer is coupled to the vehicle manually through an infotainment system, for example, this cannot be relied on for the purposes of compensating for the presence of a trailer in automated vehicle manoeuvres as the driver may forget to input the required information, or may enter information inaccurately.

The present invention has been devised to mitigate or overcome at least some of the above-mentioned problems.

SUMMARY OF THE INVENTION

According to an aspect of the present invention there is provided a method for determining the presence of a trailer attached to a vehicle. The method comprises controlling a vehicle system to obtain a primary indication of the presence of a trailer, and controlling one or more further vehicle systems to obtain one or more secondary indications of the presence of a trailer. The method further comprises determining a confidence level for the presence of a trailer attached to the vehicle in dependence on the primary indication and the or each secondary indication.

By comparing at least two indications of the presence of a trailer, the confidence level that a trailer is present can be increased compared with the conventional approach described above in which only one indication is relied on, namely the electrical current drawn through an electrical connection point. Moreover, the indications obtained from different vehicle systems are inherently different in nature, and so provide a range of tests that increase the ability of the vehicle to distinguish between a trailer and other items that may be attached to the rear of the vehicle, such as a bike rack or tailgate carrier.

By increasing the confidence level, the vehicle is more able to respond accordingly by activating or deactivating features that are related to the presence of a trailer. For example, appropriate compensation can be applied for automated manoeuvres such as parking or obstacle avoidance.

Controlling a vehicle system to obtain the primary indication of the presence of a trailer may comprise applying an electrical voltage to an electrical connector of the vehicle to which a trailer may be connected, and comparing an electrical parameter of an electrical current drawn through the electrical connector with a threshold. The electrical parameter may be a magnitude of the current, for example.

As the primary indication provided by applying an electrical voltage to an electrical connector to which a trailer may be connected is a somewhat unreliable means for determining the presence of a trailer, for the reasons listed above, obtaining a secondary indication from a vehicle system beneficially improves the confidence level for whether a trailer is present.

The further vehicle systems from which the secondary indications are derived may include a rear-mounted camera, one or more proximity sensors such as parking sensors associated with a parking distance control system, or a braking system such as an anti-lock braking system, to name a few examples. Each of these systems can provide data that can assist in confirming whether an item is attached to the rear of the vehicle, and moreover whether that item is likely to be a trailer as opposed to a bike rack or a tail-gate carrier.

If the one or more further vehicle systems comprise a camera, the obtaining the one or more secondary indications of the presence of a trailer may comprise capturing an image of a scene to the rear of the vehicle, and recognising an object within the image by analysing data related to the image. The object may correspond to a trailer, in which case the method may comprise: capturing a series of images of the scene to the rear of the vehicle; determining a level of distortion of the object in each image; obtaining data indicative of movement of the vehicle while the images were captured; determining an expected yawing of a trailer based on the indicated movement of the vehicle; and determining whether the distortion of the object within the images corresponds to the expected yawing of a trailer.

Alternatively, the object may not correspond to a trailer, in which case the secondary indication provided by the camera is indicative that a trailer is not present. For example, the object recognised in an image may be a bike, which can give a clear indication that a trailer is not attached.

The one or more further vehicle systems may comprise a proximity sensor, in which case the obtaining the one or more secondary indications of the presence of a trailer comprises emitting signals from the proximity sensor, receiving reflected signals at the proximity sensor and analysing the received signals to determine the presence of an object corresponding to a trailer. Such embodiments may further comprise monitoring a distance of the object from the vehicle.

The one or more further vehicle systems may comprise a plurality of proximity sensors that are spaced from one another, in which case the method comprises: determining an angle of the object relative to the vehicle based on a distance of the object from each proximity sensor; monitoring the angle of the object over a time period; obtaining data indicative of movement of the vehicle during the time period in which the angle of the object is monitored; determining an expected yawing of a trailer based on the indicated movement of the vehicle; and determining whether the angle of the object relative to the vehicle during the time period corresponds to the expected yawing of a trailer.

The one or more further vehicle systems may comprise a braking system, in which case the obtaining the one or more secondary indications of the presence of a trailer comprises obtaining data indicative of movement of the vehicle from the braking system, and comparing the indicated movement of the vehicle with expected movement of the vehicle. A trailer may be assumed to be attached to the vehicle when determining the expected vehicle movement, or alternatively it may be assumed that no trailer is attached.

In some embodiments, the method comprises activating one or more vehicle features in dependence on the determined level of confidence that a trailer is present. In such embodiments, the method may comprise activating a particular vehicle feature only when the level of confidence that a trailer is present exceeds a respective threshold for that feature.

The method may comprise determining a high level of confidence that a trailer is present if each of the primary and secondary indications are indicative that a trailer is present. Conversely, the method may comprise determining a high level of confidence that a trailer is not present if each of the primary and secondary indications is indicative that a trailer is not present.

Another aspect of the invention provides a method for determining the presence of a trailer attached to a vehicle. The method comprises controlling a vehicle system to receive a waveform originating from behind the vehicle, and analysing the characteristics of the received waveform to determine a confidence level that the waveform was reflected towards the vehicle system by a trailer.

The received waveform may be an acoustic waveform such as an ultrasonic signal, in which case the vehicle system comprises one or more proximity sensors that receive the acoustic waveform. Such embodiments may comprise emitting an acoustic wave from at least one of the one or more proximity sensors, so that the received waveform is a reflected counterpart of the acoustic wave emitted by the at least one proximity sensor. A respective waveform may be received at each of the one or more proximity sensors.

Alternatively, the received waveform may be an electromagnetic waveform such as visible light, in which case the vehicle system comprises a camera that receives the electromagnetic waveform. Such embodiments may comprise capturing an image of a scene to the rear of the vehicle, and recognising an object within the image by analysing data related to the image.

In another aspect, the invention also extends to a vehicle control system for determining the presence of a trailer attached to a vehicle. The control system comprises a controller configured to control a vehicle system to obtain a primary indication of the presence of a trailer, and to control one or more further vehicle systems to obtain one or more secondary indications of the presence of a trailer. The control system further comprises an input configured to receive the primary indication and the or each secondary indication, and a processor arranged to determine a confidence level for the presence of a trailer attached to the vehicle in dependence on the primary indication and the or each secondary indication.

An electronic memory device having instructions stored therein may be electrically coupled to the processor, the processor being configured to access the memory device and to execute the instructions stored therein such that it is operable to determine the level of confidence that a trailer is present.

The invention further extends to a vehicle comprising such a control system, and to a vehicle or vehicle control system configured to perform the methods of the above aspects. Further aspects of the invention provide a computer program product comprising computer readable code for controlling a computing device to perform the methods of the above aspects, and to a non-transitory computer readable medium comprising such a computer program product.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
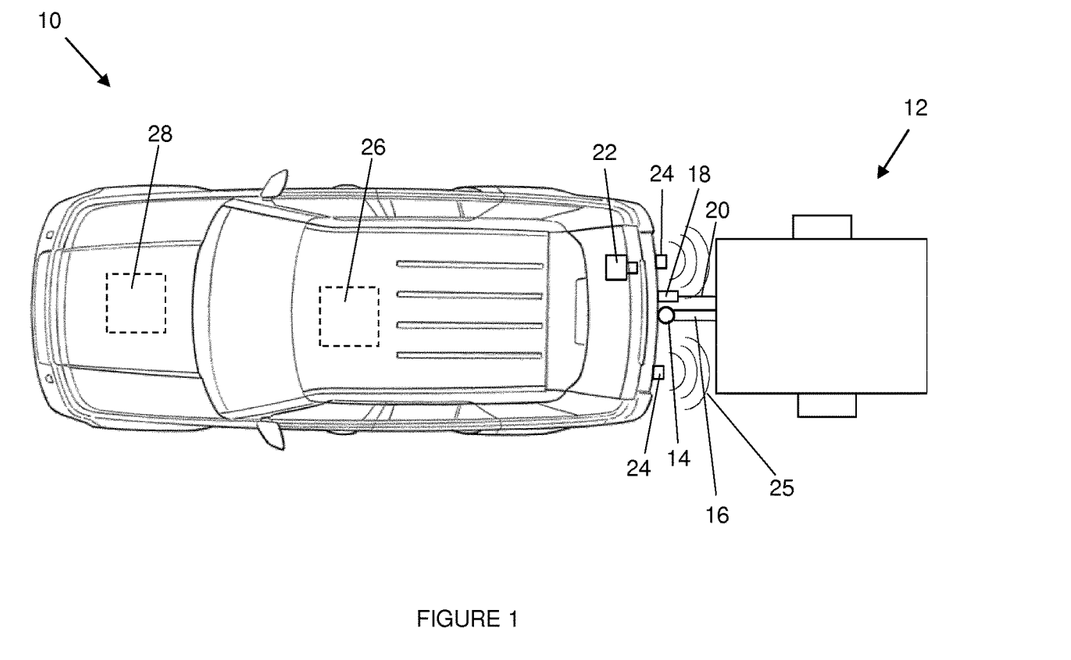
FIG. 1 is a schematic plan view of a vehicle-trailer combination that is suitable for use with embodiments of the invention.

FIG. 1 shows a vehicle 10 towing a two-wheel trailer 12. The trailer 12 is attached to a tow-ball 14 of the vehicle 10 by way of a rigid tow-bar 16, which holds the trailer 12 at a constant distance behind the vehicle 10, as is conventional. The tow-bar 16 is able to pivot around the tow-ball 14, allowing the trailer 12 to yaw with respect to the vehicle 10, for example as the vehicle-trailer combination traverses a bend.

A terminal defining an electrical connection point 18 is disposed at the rear of the vehicle 10, to which an electrical cable 20 extending from the trailer 12 connects. Electrical power is delivered from a battery (not shown) of the vehicle 10 through the electrical connection point 18 and the electrical cable 20 to power electrical systems included on the trailer 12. In particular, these systems include lighting at the rear of the trailer that replicates the functionality of rear lights of the vehicle 10, which may be obscured by the trailer 12.

Also residing on the vehicle 10 are a rear-mounted camera 22 that is used for assisting parking manoeuvres, and a pair of rearward-facing parking sensors 24 associated with a parking distance control (PDC) system, the parking sensors 24 being spaced from one another and disposed to each side of the tow-ball 14. It is noted that in practice there would typically be more than two parking sensors present on the rear of the vehicle 10, but for simplicity only two are shown in FIG. 1. The parking sensors 24 may be ultrasonic sensors, for example, or other forms of proximity sensing may be used such as laser sensors or LIDAR.

As shall be explained, embodiments of the invention make use of the camera 22 and the ultrasonic sensors 24 to provide supplementary indications of the presence of the trailer 12. This can increase the level of confidence that a trailer 12 is coupled to the vehicle 10, which aids decision making in enabling or disabling certain features of the vehicle 10.

DC electrical power is supplied to the trailer 12 through the electrical connection point 18 under the control of a body control module (BCM) 26. The BCM 26 is an electronic control unit that is responsible for controlling various electronic systems within the vehicle 10, including electric windows, air conditioning, and a range of other systems.

A primary indication of the presence of a trailer 12 is provided in the conventional manner described above, by operating the BCM 26 to apply a DC voltage at the electrical connection point 18, to measure the magnitude of electrical current drawn from the connection point 18, and to check whether the current magnitude exceeds a pre-determined threshold.

The primary indication provided by the conventional technique may be unreliable because an electrical current may be drawn by items other than a trailer, or a trailer may have low-power components that do not draw a large enough current to be detected. Accordingly, in embodiments of the present invention further indications of the presence of the trailer 12 are obtained from other vehicle systems including the rear-mounted camera 22, the parking sensors 24, and an anti-lock braking system (ABS) 28. Each of these options is considered in turn below, but it is first noted that obtaining secondary indications of the presence of a trailer 12 alongside the primary indication obtained by the BCM 26 increases the level of confidence over whether a trailer 12 is present, for improved decision making within the vehicle 10.

The rear-mounted camera 22 captures images of a scene directly behind the vehicle 10. Such images may be relayed to a display within the vehicle 10 to guide a driver while reversing the vehicle 10, for example. In embodiments of the invention, the rear-mounted camera 22 is activated to provide a secondary indication of the presence of a trailer 12. The rear-mounted camera 22 captures images, which are analysed using image-recognition algorithms to identify the presence of an object within them that is likely to be a trailer 12. In an embodiment the rear-mounted camera is activated in this manner when the vehicle 10 is initially started, to provide knowledge of the presence of a trailer 12 from the outset. Activation at other times in vehicle usage may also be useful.

Figure 2A:
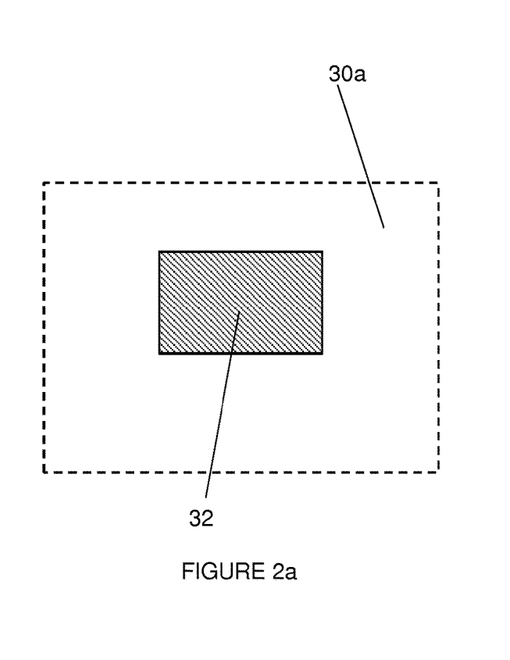
FIGS. 2a and 2b show a pair of images captured by a rear-mounted camera of the vehicle of FIG. 1.
Figure 2B:
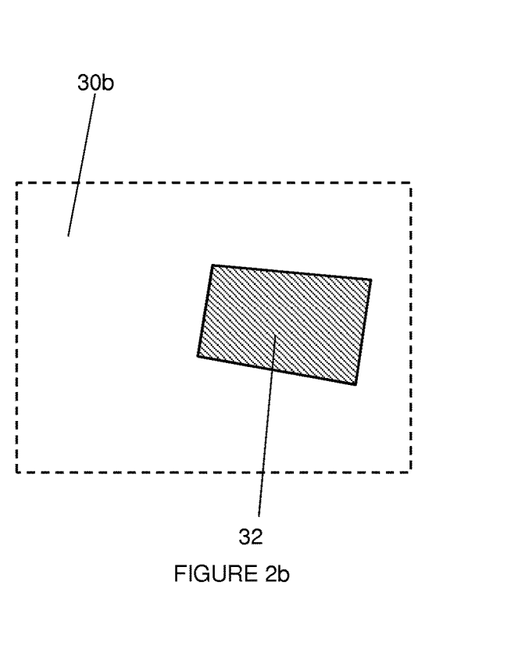

FIGS. 2a and 2b schematically represents a pair of images 30 captured by the rear-mounted camera 22. As the vehicle 10 is towing a trailer 12 in this example, each image 30a, 30b contains an object 32 corresponding to the trailer 12, and that is identifiable as such by image recognition algorithms. The algorithm assesses whether the dimensions of the object 32 fall within a range that corresponds to those of typical trailers 12, taking into account the distance and perspective of the trailer 12 from the rear-mounted camera 22 at typical towing distances.

In the image 30a shown in FIG. 2a, the object 32 appears as rectangular, indicating that this image 30a relates to a typical driving scenario in which the trailer 12 is aligned with the vehicle 10. The image 30b in FIG. 2b shows the object as trapezoidal, which relates to a scenario in which the trailer 12 is not aligned with the vehicle 10, and is instead yawing with respect to the vehicle 10, for example because the vehicle 10 is travelling around a bend. Due to the change in angle between the trailer 12 and the vehicle 10, the shape of the object 32 in the right image 30b is distorted compared with the left image 30a where the vehicle 10 and the trailer 12 are aligned.

The expected distortion of the object 32 in images 30 captured by the rear-mounted camera 22 can be used to enhance the level of confidence associated with the secondary indication of the presence of a trailer 12 provided by the rear-mounted camera 22. Specifically, a series of images 30 can be acquired and processed to determine whether an object 32 appearing in them distorts as expected for a trailer 12 with reference to how the vehicle 10 is behaving as the images 30 are captured. The behaviour of the vehicle 10 may be determined from data provided by vehicle behaviour systems 28, for example the ABS or a steering wheel system. Other systems may be used to determine vehicle behaviour.

Accordingly, if the vehicle behaviour system 28 indicates that the vehicle 10 is traversing a bend, a trailer 12 attached to the vehicle 10 would be expected to be yawing with respect to the vehicle 10, and so should appear in any images 30 captured by the rear-mounted camera 22 as a trapezoidal object 32; as in FIG. 2b 30b. Conversely, if the vehicle 10 is moving in a straight line, a trailer 12 would be expected to appear as a rectangle, as in FIG. 2a 30a.

In addition, as the trailer 12 is set at a fixed distance from the vehicle 10, the object 32 in the images 30 should be constant in size. An object 32 that varies in size from one image 30 to the next may be, for example, a following vehicle. In such scenarios the image recognition algorithm determines that the object in at least one of the images 30 is not the trailer 12.

If an object 32 that appears to be a trailer 12 is detected in an image 30 captured by the rear-mounted camera 22, and the form of that object 32 then changes as expected through a series of images 30, a high level of confidence can be assigned to the secondary indication of the presence of a trailer 12.

Conversely, any deviation from the expected form of the object 32 in the images 30 is indicative that the object 32 may not be a trailer 12. For example, if an image 30 contains an object 32 that does not change in shape as the vehicle 10 turns through a corner, indicating that the angle between the object 32 and the vehicle 10 remains constant as the vehicle 10 manoeuvres, the object 32 is more likely to be a bike rack or a tailgate carrier, for example, than a trailer 12.

Parking sensors 24 may be utilised to provide a further secondary indication of the presence of a trailer 12. The parking sensors 24 ordinarily only provide feedback to the user whilst the vehicle 10 is manoeuvring, in order to identify the proximity of objects rearward to the vehicle 10. The parking sensors 24 may, however, be activated without such feedback given to the user to provide data for other applications. Conventional parking sensors 24 typically operate over a relatively short range of up to a few metres, for example, and therefore, data from the parking sensors 24 can be utilised whilst the vehicle 10 is at rest or moving forwards for the purposes of providing a further secondary indication of the presence of a trailer 12 without detecting objects such as following vehicles.

In use, a first one of the pair of parking sensors 24 emits an ultrasonic pulse 25 rearwardly from the vehicle 10, as indicated by the curved dashed lines 25 in FIG. 1. The signals that are reflected by any objects within range are then collected by both of the parking sensors 24 present on the vehicle 10. The relative strengths and delays of the signals received by both parking sensors 24 is compared to estimate the position of the object that reflected the signals. This process is then repeated for the second parking sensor 24, which emits a signal 25, and again any signals that are reflected are collected by both parking sensors 24. The results of the two scans can be combined to build a map of the surroundings rearward to the vehicle, that shows any objects within scanning range.

Figure 3A:
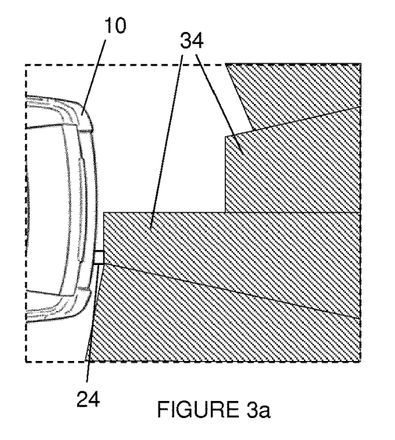
FIGS. 3a and 3b show a series of images of a scanning procedure performed by a set of parking sensors of the vehicle of FIG. 1.
Figure 3B:
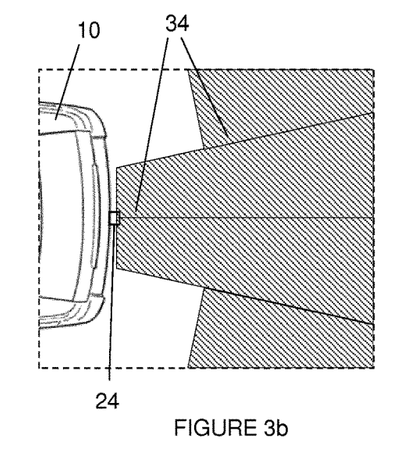

This principle is illustrated in FIGS. 3a and 3b, which shows a series of two scans. A first scan, shown in the FIG. 3a, involves emitting an ultrasonic signal from a parking sensor 24 situated on the nearside of the vehicle 10, shown towards the bottom of the vehicle 10 in FIG. 3a. The shaded areas behind the vehicle 10 represent returning signals 34 that have been reflected by a trailer 12. Signals 34 reflected by portions of the trailer 12 directly behind the sensor 24 have the shortest distance to travel, as they traverse a path extending orthogonally to the rear of the vehicle 10. Signals returning from the central and upper portions of the trailer 12, as viewed in FIG. 3a, travel along a path that is inclined relative to the rear of the vehicle 10, and which is therefore longer. Accordingly, the signals reflected by the portion of the trailer 12 directly behind the sensor 24 return more quickly than those reflected by other portions of the trailer 12.

The image shown in FIG. 3b relates to a scenario in which the initial ultrasonic signal is emitted by a sensor 24 positioned in line with a central longitudinal axis of the vehicle 10. In this scenario, signals 34 reflected by a central portion of the trailer 12, which is directly behind the emitting sensor 24, return quickest. Meanwhile, signals 34 reflected by side portions of the trailer 12 take longer to return to the emitting sensor 24.

By analysing the differing patterns of reflected signals 34 arising when an ultrasonic signal is emitted from each parking sensor 24, the overall size and shape and orientation of an object behind the vehicle 10 can be identified, allowing a map of the environment to the rear of the vehicle to be produced. Therefore, the parking sensors 24 work in combination with each other to provide similar imaging functionality to that offered by the rear-mounted camera 22.

In embodiments of the invention the resulting map is analysed in a similar manner to the images captured by the rear-mounted camera. Specifically, if an object within the parking sensors 24 map matches the known profile of a trailer 12, and remains at a substantially constant displacement from the vehicle 10, there is a high likelihood that the detected object is a trailer 12. In this respect, it is noted that an object matching the profile of a trailer 12 may either be a trailer 12 or, conceivably, a following vehicle. The distance of a trailer 12 from the vehicle 10 varies only within a small range due to yawing of the trailer 12 relative to the vehicle 10, whereas the distance between the main vehicle 10 and a following vehicle would be expected to vary more significantly. Thus, an object at a substantially constant distance from the vehicle 10 is assumed to be a trailer 12.

This technique is less susceptible to false detections if a bike rack or tailgate carrier is present, as compared to the case where the electrical connection point 18 only is used to sense the presence of a trailer 12, in that the parking sensor 24 map can be used to distinguish between a trailer 12 and another type of equipment.

It is noted that a single parking sensor 24 may be used, although in this situation only the distance to an object from the parking sensor 24 behind the vehicle 10 can be determined. In such situations, detected objects are assumed to span the scanned area behind the vehicle 10.

Similarly, other types of proximity sensor such as laser sensors can offer a reasonable degree of confidence that a trailer 12 is present by providing an indication that an object is following the vehicle 10 at a substantially constant distance that corresponds to the expected displacement of a trailer 12.

Furthermore, as the spaced parking sensors 24 provide a measurement of the orientation of a detected object, the angle of the object relative to the vehicle 10 is monitored and compared with the expected yawing of a trailer 12 based on data provided by the vehicle behaviour system 28, similarly to the way that objects appearing in images 30 captured by the rear-mounted camera 22 are analysed. In this way, the level of confidence associated with the secondary indication of the presence of a trailer 12 provided by the parking sensors 24 is increased.

It should be noted that usage of either the rear-mounted camera 22 or the parking sensors 24 to detect the presence of a trailer 12 involves using a vehicle system to receive waveforms originating from behind the vehicle 10. In the case of the rear-mounted camera 22 those waveforms are electromagnetic radiation in the form of visible light reflected from the trailer 12, whereas for the parking sensors 24 the waveforms are reflected counterparts to signals 25 previously emitted by the parking sensors 24, which as noted above may be ultrasonic signals, electromagnetic signals in the form of lasers, or various other types of signal. The received waveforms are then analysed to determine whether their characteristics are consistent with what would be expected had they been reflected from a trailer 12. This entails constructing the waveform into an image and then performing image recognition in the case of the rear-mounted camera 22, or mapping the returning signals to identify objects with the ultrasonic parking sensors 24, for example. Accordingly there is a common theme in the two approaches for obtaining a secondary indication of the presence of a trailer 12.

As noted above, the vehicle behaviour system 28 itself can provide a further secondary indication of the presence of a trailer 12, in that trailers 12 have a known impact on vehicle dynamics and so data supplied by the vehicle behaviour system 28 indicative of vehicle movement, such as turning, acceleration and tractive performance, can be analysed to predict whether a trailer 12 is attached to the vehicle 10. Such analysis entails comparing the indicated movement of the vehicle 10 with expected movement of the vehicle 10 if a trailer 12 is either present or absent.

For example, the vehicle behaviour system 28 may be an ABS, which can supply data showing individual rotational speeds of each wheel of the vehicle 10. Such data can be used to derive vehicle acceleration performance and other behaviour, noting that small differences in wheel speeds can be used to determine turning of the vehicle 10, whereas large differences in wheel speeds indicate loss of traction. All of these indicated parameters may be useful in determining whether a trailer 12 is present.

Although this technique provides a less direct indication of the presence of a trailer 12 than those discussed above, it nonetheless offers increased confidence of the presence of a trailer 12 when combined with the primary indication, and optionally one or more other secondary indications.

For each of the types of secondary indication described above, the relevant apparatus may be modified to perform the required analysis and output the indication sought. For example, the rear-mounted camera 22 may include a processing module that is programmed to analyse captured images to detect the presence of a trailer 12. Similarly the PDC system that controls the parking sensors 24 may be adapted to perform such analysis, as might the vehicle behaviour system 28. The resulting indications of the presence of a trailer 12 are then supplied to a vehicle controller, the BCM 26 for example, which collates all of the indications provided by vehicle systems throughout the vehicle 10 to determine an overall level of confidence that a trailer 12 is present.

Alternatively, a dedicated module may be provided within the vehicle 10 that is configured to extract the requisite data from the rear-mounted camera 22, the parking sensors 24 and/or the vehicle behaviour system 28, and to analyse the data to determine the level of confidence that a trailer 12 is present. Extracting the required information typically involves issuing control commands to control each vehicle system to capture the required data, for example by controlling the rear-mounted camera 22 to capture a series of images outside of its normal operating times.

In each case, the relevant controller includes suitable inputs for receiving the indications derived from the vehicle systems, and a processor that is capable of analysing the indications to resolve any conflicting indications and to determine the level of confidence that a trailer 12 is present.

Figure 4:
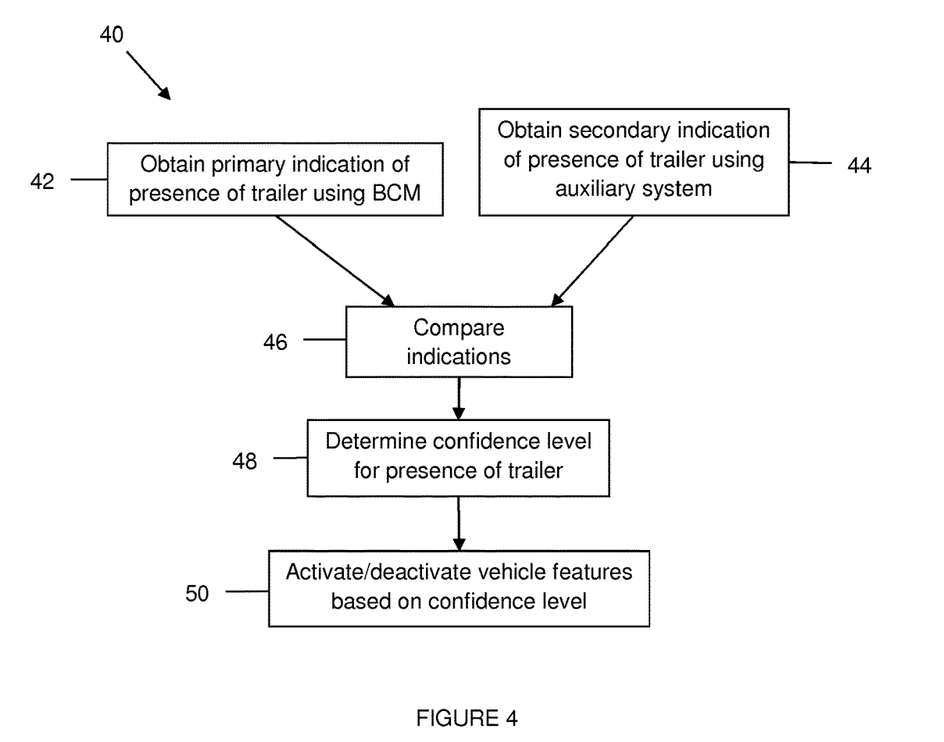
FIG. 4 is a flow diagram showing a process for assessing a confidence level for the presence of a trailer according to an embodiment of the invention.

FIG. 4 shows a process 40 for assessing whether a trailer 12 is attached to a vehicle 10. The process 40 begins by operating the BCM 26 at step 42 to obtain a primary indication of the presence of a trailer 12 in the conventional manner, namely by applying a voltage to the electrical connection point 18 and comparing the current drawn with a pre-determined threshold. This step is typically triggered on starting the vehicle 10.

In parallel, one or more secondary indications of the presence of a trailer 12 are obtained at step 44 from auxiliary systems such as the rear-mounted camera 22 or the parking sensors 24, as described above. It is noted that the ability of the auxiliary systems to detect the presence of a trailer 12 is limited while the vehicle 10 is stationary, because there is no yawing of the trailer 12 for the rear-mounted camera 22 or the parking sensors 24 to detect. Moreover, no vehicle dynamics information is available from the vehicle behaviour system 28 until the vehicle 10 starts moving. Therefore, after the vehicle 10 commences movement the secondary indications are updated, either periodically or continuously.

Once the primary and secondary indications have been obtained, they are compared at step 46, so that a confidence level for the presence of a trailer 12 can be determined at step 48. If all indications show that a trailer 12 is present, a high level of confidence can be assigned that a trailer 12 is present. Similarly, if all indications show that nothing is connected, a high level of confidence that no trailer 12 is present can be assigned.

The skilled reader will appreciate that there are several other possible combinations where the indications are in conflict, each of which is resolved according to the specific circumstances.

For example, if the primary indication shows that a trailer 12 is connected, whereas monitoring of an object in images captured by the rear-mounted camera 22 shows that the object does not yaw as would be expected for a trailer 12, it is assumed that the object is a bike rack or a tailgate carrier that is connected to the electrical connection point 18, and a low level of confidence is assigned for the presence of a trailer 12. In this way, the primary indicator shows that something is connected to the rear of the vehicle 10, and the secondary indicator acts to establish precisely what type of equipment is drawing power through the electrical connection point 18.

In another example, if the primary indication shows that nothing is connected to the electrical connection point 18, but the parking sensors 24 provide a secondary indication that an object is coupled to the vehicle 10 and the vehicle behaviour system 28 provides a further secondary indication that a trailer 12 is attached, a medium or high level of confidence may be assigned that a trailer 12 is present. In this case, it is assumed that the primary indication has provided incorrect information for one of the reasons listed earlier.

It is noted that whereas the primary indication is binary in nature, the secondary indications are less clear in nature and so may have individual levels of confidence associated with them. For example, if the parking sensors 24 merely detect an object behind the vehicle 10, this may be assigned a low level of confidence, whereas if the object maintains a constant distance behind the vehicle a medium level of confidence may be determined, and if the object yaws as expected for a trailer 12 a high level of confidence should be assigned.

A scoring system may be implemented for each of the indications, so that the overall level of confidence for the presence of a trailer can be determined by summing or otherwise combining the individual scores provided by each indication. Each indication will be scored in a manner that takes into account the reliability of the indication to provide appropriate weighting for each indication within the overall score.

Once the overall level of confidence that a trailer 12 is present has been determined, various vehicle features are activated or deactivated at step 50 based on that level of confidence. If the level of confidence that a trailer 12 is present is high, all vehicle features that depend on the presence of a trailer 12 are activated. Conversely, if there is a high level of confidence that a trailer 12 is not present, all features relating to trailers 12 are deactivated and other vehicle features that require a high level of confidence that a trailer is not present are activated.

If the level of confidence is somewhere between these two extremes, the relevant vehicle features may be activated selectively based on the specific situation. Typically, critical features are activated only where there is a high level of confidence that a trailer 12 is or is not present, critical features being those for which the consequences of inappropriate activation are severe compared with the consequences of inappropriate deactivation. For example, depending on the specific vehicle configuration, compensation for the presence of a trailer 12 for obstacle avoidance and automated parking manoeuvres may be considered critical features.

Less critical features can be activated at lower levels of confidence. Such features might include disabling the parking sensors 24 for the purposes of assisting parking, operating the trailer lights through the electrical connection point 18, and using the rear-mounted camera for tow-assist.

The activation or deactivation of vehicle features may be implemented by publishing the determined level of confidence of the presence of a trailer 12 on a vehicle bus, to enable other vehicle systems to access the information and then use it to make a decision regarding activating specific features.

In some embodiments, if there is at least a medium level of confidence that a trailer 12 is present, this may be used to trigger a prompt to the driver to confirm the presence of a trailer 12 through the infotainment system. By restricting such prompts to times when the level of confidence is at a medium or high level, nuisance prompts can be avoided, thus improving the chances of eliciting effective driver input. Confirmation from the driver that a trailer is or is not present further increases or decreases the level of confidence that a trailer 12 is present.

Many modifications may be made to the above examples without departing from the scope of the present invention as defined in the accompanying claims. For example, the skilled person will appreciate that further vehicle systems other than those referred to above can be used to obtain data that may be indicative of the presence of a trailer, any of which can be used as a secondary indicator in providing an overall assessment of the level of confidence that a trailer is present.

Moreover, the electrical technique for detecting the presence of a trailer need not be used as a primary indication, or indeed at all. In alternatives, a combination of two or more of the above described techniques for providing secondary indications may be used to provide a sufficient level of confidence that a trailer is present. For example, the rear-mounted camera may be used to provide a primary indication of the presence of a trailer, while the parking sensors provide a secondary indication.

Additionally, while the above description relates to the use of one or more secondary indications to improve the level of confidence that a trailer is present above that offered by a lone primary indication, it is envisaged that each of the techniques described above will be refined to the extent that they can be used in isolation while providing a sufficient level of confidence that a trailer is present. For example, once image recognition algorithms have been developed to an advanced stage, the rear-mounted camera will be able to detect the presence of a trailer with a reasonable degree of certainty, thus dispensing with the need for further tests to provide secondary indications.

The invention claimed is:

1. A method for determining a presence of a trailer attached to a vehicle, the method comprising:
controlling a vehicle system to obtain a primary indication of the presence of the trailer, wherein controlling the vehicle system to obtain the primary indication of the presence of the trailer comprises:
applying an electrical voltage to an electrical connector of the vehicle to which the trailer is connected; and
comparing an electrical parameter of an electrical current drawn through the electrical connector with a threshold;
controlling one or more further vehicle systems to obtain one or more secondary indications of the presence of the trailer, wherein the one or more further vehicle systems comprise a camera, and the obtaining the one or more secondary indications of the presence of the trailer comprises
capturing an image of a scene to the rear of the vehicle; and
recognizing an object within the image by analyzing data related to the image; and
determining a confidence level for the presence of the trailer attached to the vehicle based on either or both the primary indication and any of the one or more secondary indications.

2. The method of claim 1, further comprising:
capturing a series of images of the scene to the rear of the vehicle;
determining a level of distortion of the object in each image;
obtaining data indicative of movement of the vehicle while the images were captured;
determining an expected yawing of the trailer based on the indicated movement of the vehicle; and
determining whether the distortion of the object within the images corresponds to the expected yawing of the trailer.

3. The method of claim 1, wherein the object does not correspond to the trailer, and wherein the secondary indication provided by the camera is indicative that the trailer is not present.

4. The method of claim 1, wherein the one or more further vehicle systems comprise a proximity sensor, and the obtaining the one or more secondary indications of the presence of the trailer comprises:
emitting signals from the proximity sensor;
receiving reflected signals at the proximity sensor; and
analyzing the received signals to determine the presence of an object corresponding to the trailer.

5. The method of claim 4, further comprising monitoring a distance of the object from the vehicle.

6. The method of claim 4, wherein the one or more further vehicle systems comprise a plurality of proximity sensors that are spaced from one another, and wherein the method further comprises:
determining an angle of the object relative to the vehicle based on a distance of the object from each proximity sensor;
monitoring the angle of the object over a time period;
obtaining data indicative of movement of the vehicle during the time period in which the angle of the object is monitored;
determining an expected yawing of the trailer based on the indicated movement of the vehicle; and
determining whether the angle of the object relative to the vehicle during the time period corresponds to the expected yawing of the trailer.

7. The method of claim 1, wherein the one or more further vehicle systems comprise a vehicle behavior system, and the obtaining the one or more secondary indications of the presence of a trailer comprises:
obtaining data indicative of movement of the vehicle from the vehicle behavior system; and
comparing the indicated movement of the vehicle with an expected movement of the vehicle.

8. The method of claim 1, further comprising activating one or more vehicle features based on the determined level of confidence that the trailer is present.

9. The method of claim 8, further comprising activating a respective one of the one or more vehicle features only when the level of confidence that the trailer is present exceeds a respective threshold for the respective feature.

10. The method of claim 1, further comprising determining a high level of confidence that the trailer is present if each of the primary and secondary indications are indicative that the trailer is present.

11. The method of claim 1, further comprising determining a high level of confidence that the trailer is not present if each of the primary and secondary indications is indicative that the trailer is not present.

12. The method of claim 1, further comprising:
capturing an image of a scene to the rear of the vehicle; and
recognizing an object within the image by analyzing data related to the image.

13. A vehicle control system for determining the presence of a trailer attached to a vehicle, the vehicle control system comprising:
a controller configured:
to control a vehicle system to obtain a primary indication of the presence of the trailer by applying an electrical voltage to an electrical connector of the vehicle to which the trailer is connected and comparing an electrical parameter of an electrical current drawn through the electrical connector with a threshold, and
to control one or more further vehicle systems having a camera to obtain one or more secondary indications of the presence of the trailer by capturing an image of a scene to the rear of the vehicle and recognizing an object within the image by analyzing data related to the image;
an input configured to receive the primary indication and the or each secondary indication; and
a processor arranged to determine a confidence level for the presence of a trailer attached to the vehicle based on either or both the primary indication and the one or more secondary indications.

14. A vehicle comprising the vehicle control system of claim 13.

15. A non-transitory, computer-readable storage medium storing instructions thereon that, when executed by one or more processors cause the one or more processors to carry out the method of claim 1.

* * * * *